March 31, 1964 E. A. FERRIS 3,127,001

ARTICLE SEGREGATING AND COUNTING APPARATUS

Filed Jan. 14, 1963

ERNIE A. FERRIS,
INVENTOR.

BY HIS ATTORNEYS.

Spensley & Horn

United States Patent Office 3,127,001

Patented Mar. 31, 1964

3,127,001
ARTICLE SEGREGATING AND COUNTING APPARATUS

Ernie A. Ferris, Westminster, Calif., assignor to TRW Semiconductors, Inc., Los Angeles, Calif., a corporation of Delaware Filed Jan. 14, 1963, Ser. No. 251,305
3 Claims. (Cl. 198—33)

This invention relates to apparatus for segregating and counting articles and more particularly to apparatus for segregating and counting small articles having an elongate longitudinally extending member.

A well-known form of packaging small, two-terminal electrical components, such as resistors, capacitors, diodes, etc. has been to provide a component body with two coaxially extending pigtail leads. This packaging form has proven readily adaptable to microminiaturization of electronic components wherein the object is to reliably package circuitry and components into as small a volume as possible while still providing adequate electrical connection thereto. For example, silicon semiconductor diodes are currently being produced having a device body approximately 0.025 inch in diameter and less than 0.1 inch in length, a pair of metallic ribbon leads projecting coaxially from either end of the body. The metallic ribbon leads are rectangular in cross section, being 0.0035 inch thick and 0.0019 inch wide, the length of the leads being 0.625 inch. Due to the extremely small physical size of such devices, when a significant number of them are gathered together in random orientation they soon become entangled and form a large mass. In order to package the devices for sale a specific number of devices must be separated from the mass, counted, and placed into the packaging container in similar orientation. It has been heretofore necessary in the packaging of such small articles to manually segregate and count the devices. Such a manual operation is relatively time consuming and involves high labor costs. The present invention is directed toward apparatus for segregating and counting electrical components and other small articles having elongate metallic portions.

Accordingly, it is an object of the present invention to provide apparatus for mechanically segregating a plurality of small articles.

It is also an object of the present invention to provide mechanical apparatus for segregating and counting a plurality of small articles.

It is an another object of the present invention to provide apparatus for segregating and counting a plurality of small articles having an elongate longitudinally extending member of magnetically attractive material.

It is another object of the present invention to provide an automatic apparatus for segregating and counting small electrical components having metallic leads projecting therefrom.

The objects of the present invention are generally accomplished by agitating a mass of articles to be segregated and counted within a container having a screen-like wall, the mesh size of which allows individual articles to be sifted in such a manner that but one article may pass through at a time. The articles sifted through the container mesh fall onto the upper surface of a circular table which is subjected to vibratory reciprocation in an inclined arcuate path of movement so that the articles falling onto the table surface will be agitated in a spirally outward path to a circumferentially extending groove and then in a circular path along the groove. The circular table is fabricated of a non-magnetic material and has a magnetic means disposed beneath the circumferentially extending groove in a predetermined orientation to provide magnetic field lines which exert a radially orienting force upon articles in the groove near the magnetic means. Thus, as the randomly oriented articles individually pass through the magnetic field they are aligned in radial orientation within the groove. The articles then continue on in the groove, due to continued vibration of the table in the hereinabove-described manner, until the articles reach an opening in the groove. The articles drop through the opening and into a loading chute or a container. Means are provided for counting the number of articles falling through the opening and into the loading chute.

The novel features which are believed to be characteristic of the invention, both as to its organization and method of operation, together with further objects and advantages thereof, will be better understood from the following description considered in connection with the accompanying drawing in which various embodiments of the invention are illustrated by way of example. Due to the particularly advantageous application of the present invention apparatus to the segregating and counting of miniature semiconductor devices, the illustrated embodiment of the apparatus will be described with respect to such use. It is to be expressly understood, however, that the drawing and explanation are for the purposes of illustration and description only, and are not intended as a definition of the limits of the invention.

Figure 1:
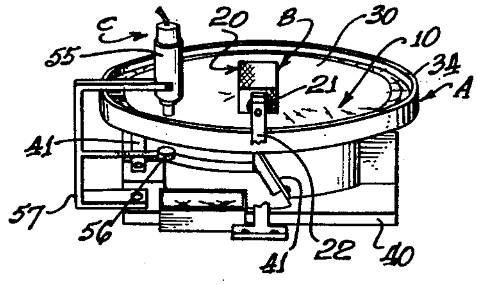
FIGURE 1 is a perspective view of the presently preferred embodiment of the present invention apparatus.

Turning now to the drawing, in FIGURE 1 there is shown a perspective view of the presently preferred embodiment of the article segregating and counting apparatus in accordance with the present invention. The apparatus generally consists of a vibratory table A, segregating and feeding apparatus B, and a counting device C. The segregating and feeding apparatus B functions to individually drop the articles to be counted on the upper surface of the vibratory table A. The articles are agitated due to vibration of the table and aligned in a predetermined manner, as will be explained hereinbelow. The articles then pass the counting device C as they leave the vibratory table. The operation of the present invention apparatus will be described with respect to the segregating and counting of the aforementioned semiconductor diodes. As can best be seen in FIGURE 5, the semiconductor diodes are generally indicated by the reference numeral 10, each diode consisting of a body 11 with a pair of metallic ribbon leads 12 and 13 coaxially extending therefrom. An entangled mass of diodes 10 are placed within the segregating and feeding apparatus B, disposed above the surface of the vibratory table.

Figure 3:
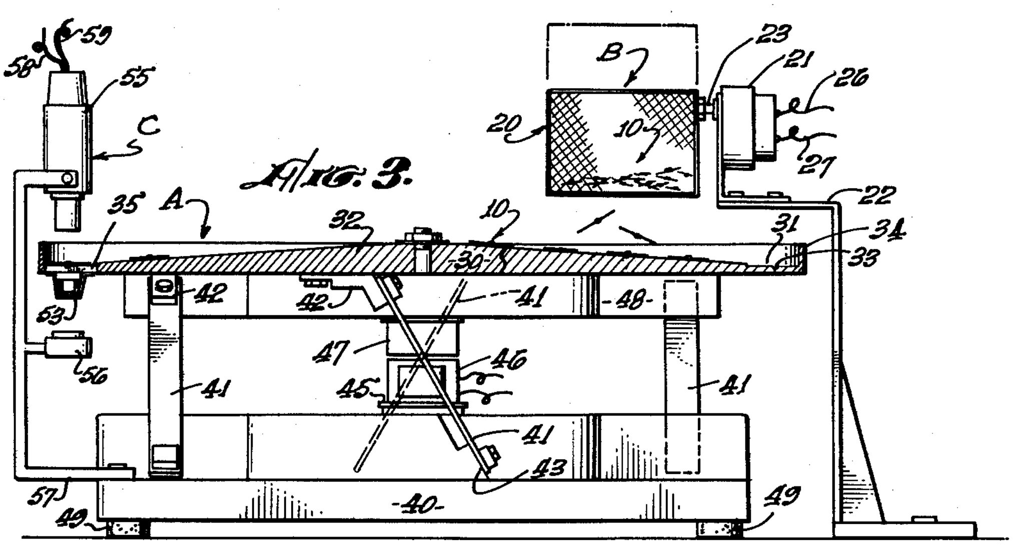
FIGURE 3 is an elevation view of the apparatus with a sectioned portion taken along the line 3—3 of FIGURE 2.
Figure 5:
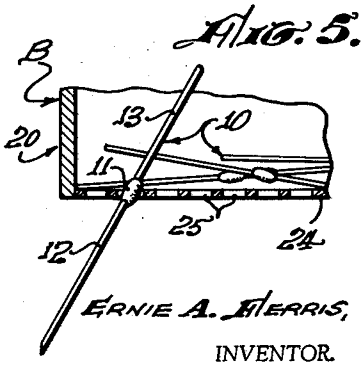

Referring to FIGURES 3 and 5 of the drawing, the segregating and feeding apparatus B consists of a container 20 mounted on the shaft of an electrical drive motor 21. The motor 21 is mounted by means of a suitable bracket 22 to the supporting surface upon which the apparatus is mounted. The container 20 is rectangular in shape and has one of its side walls 24 perforated with a plurality of holes 25 of a sufficient size to allow the longitudinal passage of the diodes 10. The side wall 24 may be constructed of perforated metal or screening of an appropriate mesh size. The electrical drive motor 21 is secured to the mounting bracket 22 with the motor shaft 23 extending over the vibratory table. The container 20 is secured to the projecting end of the motor shaft 23 near one of the edges of the container so that the container will be eccentrically rotated as indicated by the phantom lines in FIGURE 3. The electric motor 21 is connected by means of electrical leads 26 and 27, through a suitable switch, to a source of operating potential, not shown. Thus, energization of the electrical motor 21 and rotation of its shaft 23 will cause the tumbling agitation of a mass of diodes placed within the container 20. As the mass of diodes are tumbled, certain of the diodes will become disengaged from the mass and will be sifted through the holes 25 as the end container wall 24 passes through a lowermost horizontal position as indicated in FIGURE 5. The diodes, upon falling through the openings 25, drop onto the upper surface of vibratory table A.

Figure 4:
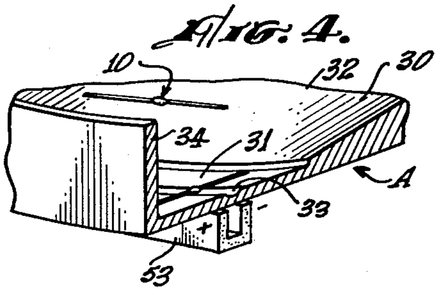
FIGURE 4 is a fragmentary perspective view taken along the line 4—4 of FIGURE 2; and, FIGURE 5 is a fragmentary elevation view of a container in the apparatus of FIGURE 1.

The vibratory table A includes a circular table top 30 having a circumferentially extending groove 31 surrounding a generally conically shaped central portion 32, with the center of the table surface highermost. The fragmentary view of FIGURE 4 shows the groove 31 in detail, the length of the groove being slightly greater than the length of the diodes 10. The central portion of the groove 31 defines a depression 33 to accommodate the body 11 of the diodes when the diodes are disposed in the groove in radial alignment. The peripheral surface of the table top defines an upstanding shoulder 34 which shoulder forms the outer boundary of the groove 33, the shoulder 34 preventing diodes from falling off the table top.

The table top 30 is mounted to a heavy base 40 by means of a plurality of leaf springs 41. One end of each leaf spring 41 is secured to the underside of the table top by means of an angularly inclined mounting bracket 42, the other end of each leaf spring being secured to an angularly inclined seat 43 formed on the base 40. Mounted within the central portion of the base 40 is an electromagnetic motor comprising a core member 45, the core being generally C-shaped and supporting coils 46. An armature 47 is mounted to a frame 48 secured to the underside of the table top, the armature extending over each of the pole faces of the core member 45. Due to the angular mounting of the leaf springs 41, each energy impulse of the motor produces a downward axial pull, causing the springs 41 to flex and move the table top in an inclined arcuate path of movement. When each energy impulse terminates, the springs return the frame to its normal position. Thus, the springs function as torsion bars which act, in conjunction with the motor, to effect reciprocation of the table top in an inclined arcuate path of movement. By tuning the springs to reciprocate the table top at the frequency of a few cycles more or less than the frequency of the driving energy impulses, the vibratory system will follow in synchronism with the frequency of the energy impulses. The base 40 is preferably a heavy casting and supported by resilient feet 49 as it must vibrate, but not as violently as the lighter mass of the frame and table top.

The coils 46 are connected by suitable means, not shown, to a source of electrical energy. It is presently preferred to couple the coils to a source of alternating current by means of a half-wave rectifier and a rheostat which allows control of the magnitude of the current pulses applied to the coils. The construction and operation of such vibratory tables are well known in the art and hence will not be discussed in further detail.

Figure 2:
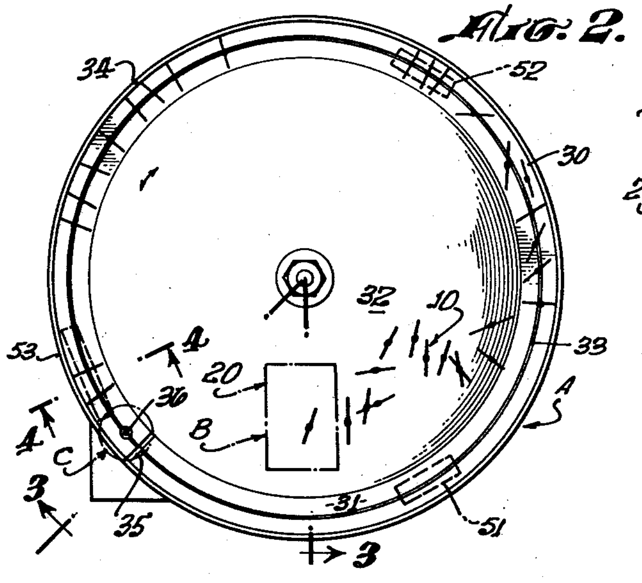
FIGURE 2 is a plan view of the apparatus of FIGURE 1.

Also secured to the underside of the table top by means of suitable mounting brackets, are three elongate bar magnets 51, 52 and 53. As can best be seen in FIGURES 3 and 4, the bar magnets are of generally U-shaped cross section and are disposed lengthwise generally beneath the central portion of the groove 31. The magnets are disposed about the periphery of the table top at approximately 120° intervals. Since, in the illustrated embodiment, the reciprocatory movement of the table top causes articles on its surface to be agitated in a counterclockwise direction, the bar magnet 51 is positioned slightly to the right of the segregating and feeding apparatus A, as can best be seen in FIGURE 2. Thus, as the diodes 10 are sifted from the container 20, they drop onto the table top 30 in a region which is in the magnetic field of the magnet 51. Therefore, the diodes will begin to rotate into radial alignment as they are urged outward and counterclockwise by vibration of the table top, the majority of the diodes reaching the peripheral groove 31 about half-way between the magnets 51 and 52. Upon reaching the groove 31, the diodes then proceed in a circular counterclockwise path along the groove, being there retained by the upstanding shoulder 34. Upon entering the magnetic field of the bar magnet 52, the diodes are again urged into radial alignment and achieve this alignment as they pass directly over the magnet 52, the magnetic field being strongest at that point. Upon achieving radial alignment, the diode bodies are received by the depression 33, which functions to retain the diodes in substantially radial alignment and prevents them from drifting outward to the shoulder 34.

The diodes continue in a counterclockwise direction along the groove and are again subjected to a radially aligning force provided by the magnetic field of the bar magnet 53.

The groove 31 is provided with a radially extending slot 35, the slot 35 being counterclockwise of the magnet 53 and just beyond its magnetic field. Upon reaching the slot 35, the diodes then are in the proper radial alignment and so drop through the slot into a loading chute or container (not shown).

A circular hole 36 extends through the table top, the hole 36 being intermediate the bar magnet 53 and the slot 35 and being centered in the depression 33 of the groove 31. The counting device is positioned in vertical alignment with the hole 36 to count the number of diodes passing over the hole as they approach the slot 35. In the illustrated embodiment, the counting device consists of a light source 55 and a photocell 56. The light source 55 is positioned above the table top for emission of a collimated light beam downward through the hole 36, the photocell 56 being positioned directly beneath the hole 36 for reception of the light beam. The light source and the photocell are held in their respective positions by a mounting bracket 57, secured to the base 40. In the illustrated embodiment, the light source 55 comprises a miniature 110 volt A.C. light bulb mounted within a housing, together with a collimating lens system. The light source 55 is coupled to a source of electrical energy, not shown, through electrical leads 58 and 59. The photocell 56 is connected through suitable electrical circuitry, not shown, to register a count each time the light beam from the light source 55 is interrupted by a diode body passing over the hole 36. The hole 36 is quite small so that it can be completely covered by the body of a diode passing down the depression 33. Thus, each diode is electrically counted just prior to dropping through the slot 35.

Although any suitable counting device can be used, the illustrated photoelectric type is presently preferred since the counting of the diodes results in the formation of electrical pulses which can be used in conjunction with suitable control circuitry to provide automatic operation of the apparatus. For example, a plurality of containers can be mounted upon an electrically controlled automatic indexing apparatus, for successively positioning individual containers beneath the slot 35. The indexing apparatus can be adjusted to be actuated upon receipt of a predetermined number of counting pulses so that all of the containers can be automatically loaded with any predetermined number of diodes.

Thus, there has been described a novel apparatus for segregating and counting small articles having an elongate longitudinally extending member of magnetic material. The present apparatus functions to segregate an entangled mass of the articles by tumbling agitation, the articles being sifted through a screen mesh and then falling on the upper surface of a vibratory table. Magnetic means are provided beneath the table top to exert a radially aligning force upon articles being agitated peripherally around the table top. The table top is provided with a peripheral groove having a configuration adapted to receive the articles and maintain them in radial alignment as they travel along the groove to a slot through which the articles drop as they leave the apparatus. The articles are counted by suitable means as they leave the apparatus. In the illustrated embodiment, the articles to be segregated and counted were semiconductor diodes comprising a semiconductor body having elongate magnetic members in the form of electrical leads coaxially extending from the body. However, those skilled in the art will appreciate that the present invention apparatus is easily adaptable for use with articles of various other configurations having an elongate longitudinally extending member of magnetic material, mainly by merely altering the configuration of the peripheral groove in the vibratory table top. Hence, although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. Apparatus for segregating individual small articles having an elongate longitudinally extending member of magnetic material from an intertwined plurality of said articles comprising:

(*a*) a generally rectangular receptacle defining a chamber bounded by sidewalls extending between a pair of end walls, a sidewall surface of said receptacle defining a plurality of holes therethrough communicating with said chamber, said holes being of a predetermined configuration to permit the selective individual passage therethrough of said articles;

(*b*) means for selectively rotating said receptacle to thereby cause the tumbling agitation of a mass of said articles contained within said receptacle to separate individual articles from said mass and sift them through said holes;

(*c*) means for receiving said articles to retain them separate from one another, said last-named means being disposed beneath said receptacle, said receiving means including magnetic means for orienting said articles in a predetermined physical alignment, said receiving means being adapted for the individual discharge of said articles therefrom in said predetermined physical alignment for further handling; and, (*d*) means for counting the number of said articles discharged from said receiving means.

2. Apparatus for segregating individual small articles having an elongate longitudinally extending member of magnetic material from an intertwined plurality of said articles comprising:

(*a*) a receptacle for receiving a plurality of said articles, said receptacle including a wall defining a plurality of openings therethrough, said openings being of a size to permit the selective individual passage therethrough of said articles when said receptacle is periodically made to move in such a position that said wall is lowermost and substantially horizontal;

(*b*) means for moving said receptacle to periodically place said wall lowermost in a substantially horizontal position;

(*c*) means for receiving said articles to retain them separate from one another, said last-named means being disposed beneath said receptacle, said receiving means including magnetic means for orienting said articles in a predetermined physical alignment, said receiving means being adapted for the individual discharge of said articles therefrom in said predetermined physical alignment for further handling; and, (*d*) means for counting the number of said articles discharged from said receiving means.

3. Apparatus for segregating individual small articles having an elongate longitudinally extending member of magnetic material from an intertwined plurality of said articles comprising:

(*a*) a receptacle for receiving a plurality of said articles, said receptacle including a wall defining a plurality of openings therethrough, said openings being of a size to permit the selective individual passage therethrough of said articles when said receptacle is periodically made to move in such a position that said wall is lowermost and substantially horizontal;

(*b*) means for moving said receptacle to periodically place said wall lowermost in a substantially horizontal position; and, (*c*) means for receiving said articles to maintain them separate from one another said receiving means being disposed beneath said receptacle, said receiving means including magnetic means for orienting said articles in a predetermined physical alignment, said receiving means being adapted for the individual discharge of said articles therefrom in said predetermined physical alignment for further handling.

References Cited in the file of this patent

UNITED STATES PATENTS

| | | |
|---|---|---|
| 1,326,925 | Goldberg | Jan. 6, 1920 |
| 2,594,337 | Noe | Apr. 29, 1952 |
| 2,920,740 | Whitted | Jan. 12, 1960 |